United States Patent
Tokui et al.

(10) Patent No.: US 10,275,860 B2
(45) Date of Patent: Apr. 30, 2019

(54) IMAGE PROCESSING DEVICE, IMAGE CAPTURING DEVICE, IMAGE PROCESSING METHOD, AND PROGRAM

(71) Applicant: Sharp Kabushiki Kaisha, Sakai, Osaka (JP)

(72) Inventors: Kei Tokui, Sakai (JP); Keisuke Omori, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/517,976

(22) PCT Filed: Aug. 27, 2015

(86) PCT No.: PCT/JP2015/074191
§ 371 (c)(1),
(2) Date: Apr. 10, 2017

(87) PCT Pub. No.: WO2016/059887
PCT Pub. Date: Apr. 21, 2016

(65) Prior Publication Data
US 2017/0293999 A1    Oct. 12, 2017

(30) Foreign Application Priority Data
Oct. 14, 2014  (JP) .................. 2014-209593

(51) Int. Cl.
G06T 5/00   (2006.01)
H04N 1/40   (2006.01)
(Continued)

(52) U.S. Cl.
CPC ............ G06T 5/003 (2013.01); G02B 27/646 (2013.01); H04N 1/40 (2013.01); H04N 1/407 (2013.01);
(Continued)

(58) Field of Classification Search
CPC .......... G06T 5/003; G06T 2207/20201; G02B 27/646; H04N 5/2621; H04N 5/262;
(Continued)

(56) References Cited

U.S. PATENT DOCUMENTS

2007/0122056 A1   5/2007 Steinberg et al.
2007/0189606 A1   8/2007 Ciuc et al.
(Continued)

FOREIGN PATENT DOCUMENTS

CN       101568908 A    10/2009
JP       2009-218704 A   9/2009

*Primary Examiner* — Nhan T Tran
(74) *Attorney, Agent, or Firm* — Keating & Bennett, LLP

(57) ABSTRACT

An image processing device including a blurring processing unit that performs blurring processing for input image information that is input, includes: a saturation determination unit that calculates saturation of a saturated pixel of the input image information; a first gradation conversion unit that converts gradation of the input image information on a basis of the saturation calculated by the saturation determination unit; and, in which the blurring processing unit performs blurring processing for image information that has been subjected to gradation conversion by the first gradation conversion unit, a second gradation conversion unit that converts gradation of image information that has been subjected to the blurring processing, on a basis that gradation of a saturated region of the blurring-processed image information serves as a gradation of a saturated pixel.

13 Claims, 12 Drawing Sheets

(51) Int. Cl.
*H04N 5/232* (2006.01)
*H04N 5/262* (2006.01)
*H04N 1/407* (2006.01)
*G02B 27/64* (2006.01)
*H04N 1/409* (2006.01)

(52) U.S. Cl.
CPC ....... *H04N 1/4092* (2013.01); *H04N 5/23229* (2013.01); *H04N 5/23264* (2013.01); *H04N 5/262* (2013.01); *H04N 5/2621* (2013.01); *G06T 2207/20201* (2013.01)

(58) Field of Classification Search
CPC ............... H04N 5/23229; H04N 1/405; H04N 5/23264; H04N 1/4092; H04N 1/40
See application file for complete search history.

(56) References Cited

U.S. PATENT DOCUMENTS

| | | | |
|---|---|---|---|
| 2007/0189748 A1* | 8/2007 | Drimbarean | G03B 13/18 396/89 |
| 2007/0189757 A1 | 8/2007 | Steinberg et al. | |
| 2008/0316328 A1 | 12/2008 | Steinberg et al. | |
| 2008/0317378 A1 | 12/2008 | Steinberg et al. | |
| 2009/0273685 A1 | 11/2009 | Ciuc et al. | |
| 2012/0057051 A1* | 3/2012 | Ito | H04N 5/23222 348/239 |
| 2012/0133801 A1* | 5/2012 | Sekine | H04N 5/217 348/241 |

\* cited by examiner

| 244 | 255 | 255 |
|-----|-----|-----|
| 242 | 255 | 255 |
| 238 | 250 | 255 |

(a)

| 255 | 255 | 255 |
|-----|-----|-----|
| 255 | 255 | 255 |
| 255 | 255 | 255 |

(b)

| 240 | 255 | 255 | 255 | 255 |
|-----|-----|-----|-----|-----|
| 240 | 255 | 255 | 255 | 255 |
| 240 | 255 | 255 | 255 | 255 |
| 240 | 255 | 255 | 255 | 255 |
| 240 | 255 | 255 | 255 | 255 |

(a)

| 255 | 255 | 255 | 255 | 255 |
|-----|-----|-----|-----|-----|
| 255 | 255 | 255 | 255 | 255 |
| 255 | 255 | 255 | 255 | 255 |
| 255 | 255 | 255 | 255 | 255 |
| 255 | 255 | 255 | 255 | 255 |

(b)

(a)

(b)

(a)

(b)

(a) (b)

IMAGE PROCESSING DEVICE, IMAGE CAPTURING DEVICE, IMAGE PROCESSING METHOD, AND PROGRAM

TECHNICAL FIELD

The present invention relates to an image processing technique.

BACKGROUND ART

Currently, a digital camera has been widely used as a device that captures a digital image. A user causes an object, which is desired to be photographed, to be automatically or manually focused on and performs a photographing operation to thereby acquire an image of the object. The object that is focused on is clearly photographed and an object that is not focused on is photographed with blur. A degree of blur is determined by an image capturing device and is able to be adjusted by the user by changing an aperture. However, in a camera module installed in a smartphone or the like, a compact digital camera, or the like, it is difficult to adjust the aperture or the depth of field is deep, so that an amount of blur desired by the user is not obtained in some cases.

Thus, a technique by which an image with a greater degree of blur than that of a captured image is obtained by blurring a background of a main object through image processing has been developed. For example, the technique includes, continuously capturing a plurality of images with different focus positions, determining in-focus degrees of objects to estimate distances, and averaging the focus positions of objects away from an in-focus main object, and by using the technique, an image whose background is blurred is generated.

On the other hand, since gamma correction processing has been performed for the captured images and relation between a captured image and brightness is nonlinear, when the captured images are simply averaged, the resulting blurred image comes to have brightness different from that of the actual blurred image captured by blurring an actual object. In a case where an object is bright, since gradation values of the captured images may be saturated, when the captured images are simply averaged, the resulting blurred image comes to have brightness different from that of the actual blurred image captured by blurring an actual object.

Thus, as a method of performing blurring processing with high quality, a technique of performing averaging processing after converting a gradation value of a captured image has been proposed, for example, in PTL 1. In PTL 1, when a value of background image data in each of pixels is high, conversion of amplifying the background image data in the pixel is performed and blurring processing is performed, and then, conversion inverse to the aforementioned conversion is performed. Thereby, blurring processing in which brightness of a high gradation part is enhanced is realized.

CITATION LIST

Patent Literature

PTL 1: Japanese Unexamined Patent Application Publication No. 2009-218704

SUMMARY OF INVENTION

Technical Problem

However, the aforementioned method has a following problem.

When blurring processing is performed with the technique as disclosed in PTL 1, an image in which high gradation is excessively enhanced is generated and image quality is deteriorated depending on a scene in some case.

For example, in PTL 1, since data are amplified not only in a saturated region but in a high gradation region, even a normal region in which an image of an object has been able to be captured without saturation may become bright, so that a blurred image may become excessively bright. Further, since the conversion depends only on gradation of a target pixel, the region where the gradation is saturated is converted uniformly without considering brightness of an actual object. That is, in an image having maximum gradation of 255, a pixel obtained by saturating a pixel, which has been desired to be photographed with a gradation value of 511, to 255 and a pixel obtained by saturating a pixel, which has been desired to be photographed with a gradation value of 256, to 255 are converted to have the same gradation value, so that an unnatural image different from the object may be generated.

In PTL 1, since gradation conversion is performed also for a middle gradation region and a low gradation region, photographing is performed by blurring an object having brightness different from that of an actual object, so that an unnatural image may be generated.

Further, in the inverse conversion of PTL 1, conversion inverse to conversion of extending the gradation value is performed, so that an image subjected to blurring processing with sufficient brightness is difficult to be generated. For example, when 8-bit data is converted to 12-bit data, a pixel with a gradation value of 255, which is a saturated pixel, is converted to have a gradation value of 4095. After that, by performing averaging processing as blurring processing, the saturated pixel always has the gradation value of 4095 or less. When the inverse conversion is performed for the pixel, the pixel has the gradation value of at least 255 or less. That is, the saturated pixel does not serve as a saturated region due to the blurring processing and a target blurred image with high luminance may not be obtained.

The invention aims to provide an image obtained by performing natural blurring processing according to brightness of an object even when there is a saturated pixel in a region subjected to blurring processing.

Solution to Problem

According to an aspect of the invention, provided is an image processing device including: a first gradation conversion unit that converts gradation of input image information that is input, on a basis of saturation of a saturated pixel of the input image information; a blurring processing unit that performs blurring processing for the input image information that has been subjected to gradation conversion by the first gradation conversion unit; and a second gradation conversion unit that converts the gradation of the input image information that has been subjected to the blurring processing, on a basis that gradation of a saturated region of the input image information that has been subjected to the blurring processing serves as gradation of a saturated pixel.

This description includes the disclosure of the description of Japanese Patent Application No. 2014-209593, from which the present application claims priority.

Advantageous Effects of Invention

According to an image processing device and an image capturing device in the invention, it is possible to synthesize, through image processing, blurred images which have natural image quality as being captured by blurring an actual object.

DESCRIPTION OF EMBODIMENTS

Embodiments of the invention will hereinafter be described specifically with reference to drawings. Expressions in the figures are exaggeratingly described to facilitate the understanding and are different from actual ones in some cases.

Embodiment 1

Figures 1, 2:
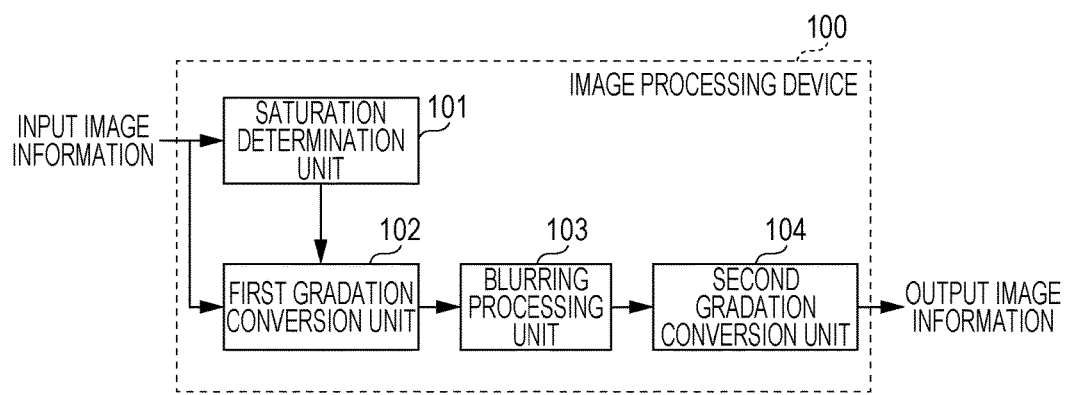
FIG. 1 is a functional block diagram illustrating a configuration example of an image processing device according to an embodiment of the invention.
FIG. 2 illustrates an example of gradation values of a target pixel and surrounding pixels.
Figure 18:
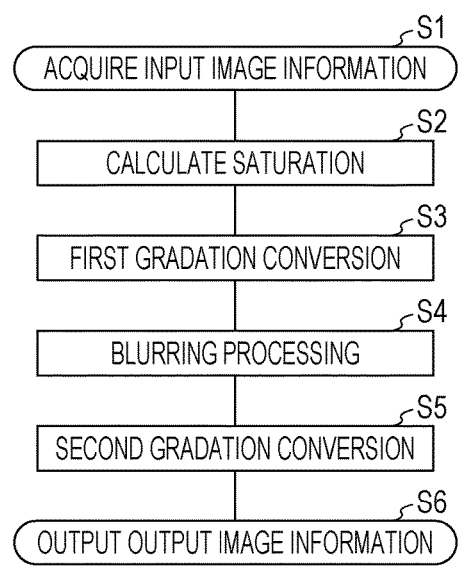
FIG. 18 illustrates an example of a flowchart of an image processing method according to the present embodiment.

FIG. 1 is a functional block diagram illustrating a configuration example of an image processing device according to the present embodiment. FIG. 18 is a flowchart illustrating a flow of processing of an image processing method. An image processing device 100 of the present embodiment includes a saturation determination unit 101, a first gradation conversion unit 102, a blurring processing unit 103, and a second gradation conversion unit 104. The image processing device 100 receives input image information and outputs a result of performing image processing as output image information. The saturation determination unit 101 determines saturation of a saturated pixel of the input image information. The first gradation conversion unit 102 performs gradation conversion of the input image information on the basis of a result of the determination of the saturation determination unit 101. The blurring processing unit 103 performs blurring processing for image information that has been subjected to the gradation conversion at the first gradation conversion unit 102. The second gradation conversion unit 104 performs gradation conversion for the image information, which has been subjected to the blurring processing at the blurring processing unit 103, and outputs the resultant as the output image information.

At step S1, input image information is acquired. At step S2, the saturation determination unit 101 calculates saturation of a saturated pixel. The saturation is used to determine a degree of saturation of the saturated pixel and the degree of saturation is greater as the saturation increases. At step S3, the first gradation conversion unit 102 performs first gradation conversion by using the calculated saturation. The conversion is performed so that a gradation value output by the conversion is greater as the saturation increases. At step S4, the blurring processing unit 103 performs blurring processing for image information that has been subjected to the first gradation conversion. The blurring processing is realized by averaging a target pixel and surrounding pixels in a specific range. When the specific range is changed in accordance with a distance between an in-focus object and an object to be blurred, natural blurring processing according to the distance is achieved. At step S5, the second gradation conversion unit 104 performs gradation conversion for the image information that has been subjected to the blurring processing. The gradation conversion is performed so that a pixel of a saturated region is saturated to have a maximum gradation value of output image information. The image information that has been subjected to image processing is output at step S6 (FIG. 18).

Each unit of the image processing device 100 is able to be realized by software processing through a CPU (Central Processing Unit) or a GPU (Graphics Processing Unit) or hardware processing through an ASIC (Application Specific Integrated Circuit) or an FPGA (Field Programmable Gate Array).

For the image information that is input, a degree of saturation of a saturated pixel of each of pixels is determined by the saturation determination unit 101. For example, in the case of image information which is 8-bit data and has gradation of 0 to 255, a pixel having gradation of 255 is the saturated pixel. When the gradation value of saturation varies depending on a photographing condition or a saving condition, however, the gradation value that is able to be regarded as a gradation value that is saturated may be appropriately set as a saturated gradation value. For example, in a case where noise is great, 254 is able to be set as the saturated gradation value, and in the case of image information using a gradation value of 16 to 235, 235 is able to be set as the saturated gradation value.

The degree of saturation determined by the saturation determination unit 101 is a degree of brightness of an object, which indicates original brightness of a gradation value of the saturated pixel. That is, it is determined whether the saturated gradation value 255 is obtained from a pixel which had originally had gradation of 256 and then has been slightly saturated to 255 or a pixel which had originally had gradation of 511 and then has been greatly saturated to 255.

A degree of saturation of the target pixel is suitably determined in accordance with not only whether the target pixel is saturated but also brightness of peripheral pixels. For example, the number of saturated pixels of the peripheral pixels of the target pixel or an average gradation value of a specific region including the target pixel is able to be calculated as the saturation to determine the degree of saturation. That is, an object having a larger area of bright objects is estimated as a brighter object and the degree of saturation is determined.

FIG. 2 illustrates an example of gradation values of a target pixel and surrounding pixels, and in FIG. 2(a), a gradation value of the target pixel arranged in the center is saturated at 255 and four pixels are saturated pixels among the eight surrounding pixels arranged around the target pixel. On the other hand, in FIG. 2(b), a gradation value of the target pixel arranged in the center is saturated at 255 and all the eight surrounding pixels arranged around the target pixel are also saturated pixels.

In this case, it is possible to determine that an image of FIG. 2(b) has higher saturation and greater brightness of an actual object compared to an image of FIG. 2(a). This is because a peripheral part of a bright object has reduced brightness when light from another object is added together, and hence a center part of the bright object is able to be estimated as being brighter than the peripheral part. Thus, since the surrounding pixels of FIG. 2(b) are brighter and more saturated compared to those of FIG. 2(a), it is possible to estimate that FIG. 2(b) is obtained from a brighter object than that of FIG. 2(a). For calculating brightness of the surrounding pixels, the calculation is able to be performed by calculating the number of saturated pixels of the surrounding pixels, calculating a sum of gradation values of the surrounding pixels, or calculating an average value of the gradation values of the surrounding pixels. In this case, the calculation of the brightness of each of the surrounding pixels may include a value of the target pixel.

Figures 3, 4:
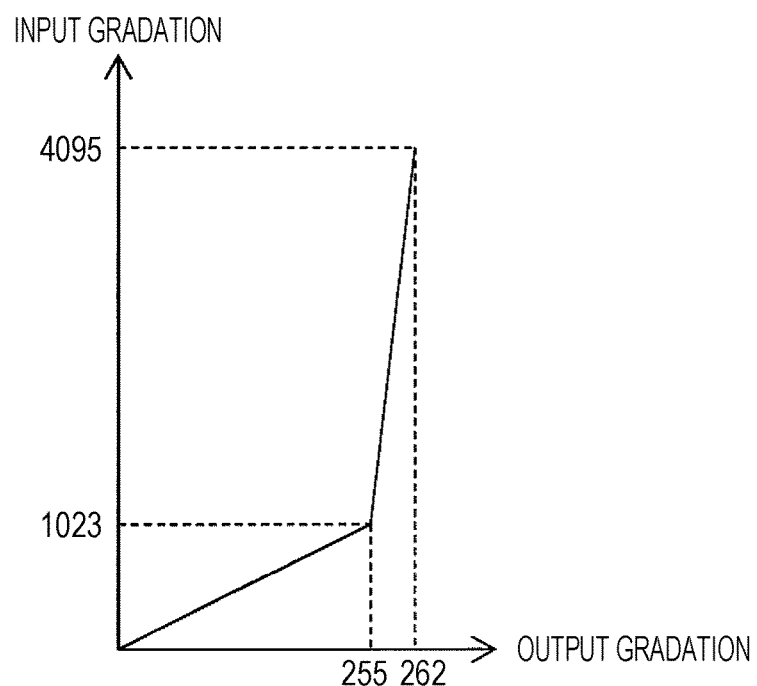
FIG. 3 illustrates an example of gradation values of a target pixel and surrounding pixels.
FIG. 4 illustrates an example of gradation conversion characteristics.

FIG. 3 illustrates another example of gradation values of a target pixel and surrounding pixels, in which a range of the surrounding pixels is different from that of FIG. 2. In FIG. 3(a), similarly to FIG. 2(b), a gradation value of the target pixel arranged in the center is saturated at 255, and eight pixels arranged near the target pixel among the surrounding pixels arranged around the target pixel are saturated pixels, and among the other sixteen pixels, eleven pixels are saturated pixels. On the other hand, in FIG. 3(b), a gradation value of the target pixel arranged in the center is saturated at 255 and all the twenty-four surrounding pixels arranged around the target pixel are also saturated pixels.

In this case, it is determined that FIG. 3(b) has higher saturation and greater brightness of an actual object compared to FIG. 3(a). This is because the saturated pixels of FIG. 3(b) are arranged in a wider range compared to FIG. 3(a). Thus, on the basis of relationships between FIG. 2 and FIG. 3, it is also possible to determine the saturation of the target pixel by changing a range of the surrounding pixels. That is, it is possible to determine that FIG. 3(b) has higher saturation than that of FIG. 3(a) or FIG. 2(b), and FIG. 3(a) or FIG. 2(b) has higher saturation than that of FIG. 2(a). The saturation calculated in this manner is transmitted to the first gradation conversion unit 102.

The first gradation conversion unit 102 performs gradation conversion in consideration of the saturation determined by the saturation determination unit 101.

The gradation conversion is able to be performed, for example, by characteristics illustrated in FIG. 4. Here, a gradation value of input image information in FIG. 4 is 0 to 255 and the saturation calculated by the saturation determination unit 101 has eight levels of 0 to 7. In a case where the gradation value of the target pixel of the input image information is 255, the saturation has been calculated, and in an example of the present embodiment, input gradation of the gradation conversion is provided by adding the saturation to the gradation value of 255. For example, when the saturation is 5, the input gradation of the gradation conversion is 260. With such processing, the gradation value of the input image information, in which a result of estimation of brightness of the saturated pixel is reflected, is able to be obtained. The output gradation value is set as 0 to 4095 in order to improve accuracy of the gradation value by blurring processing, and may be in another gradation range. Such gradation conversion is able to be realized by an LUT (Look Up Table) in which the input gradation value is associated with the output gradation value. Though the gradation is converted by using the value, which is obtained by adding the saturation to the gradation value of the input image information, as an input in the above, a similar result is obtained also by using a corresponding region of FIG. 4 for 0 to 254 and allocating the output gradation value in accordance with the saturation when the gradation value is 255.

Figure 5:
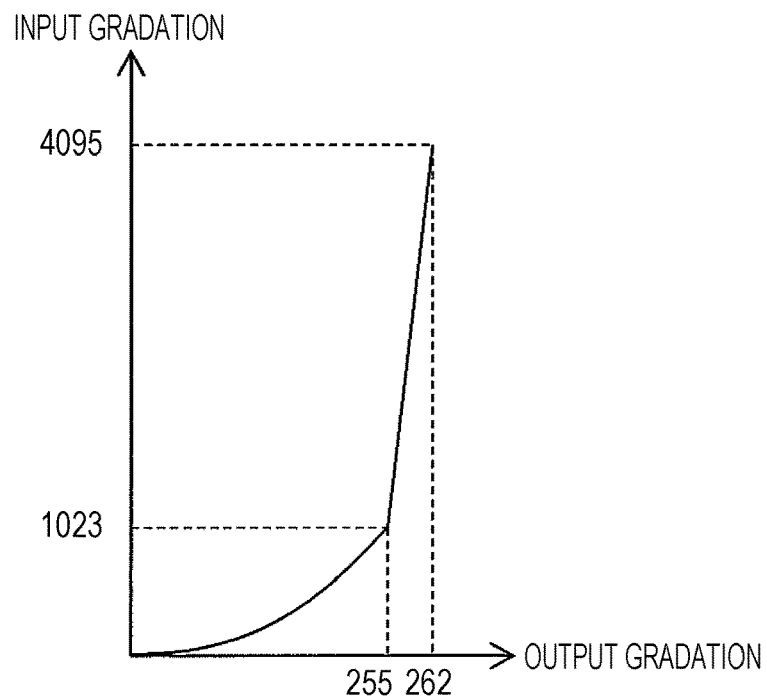
FIG. 5 illustrates an example of gradation conversion characteristics.

Here, though the conversion of FIG. 4 is desired when a relation between brightness of an object and a gradation value of image information is linear, for example, when image information that is compressed, such as a JPEG (Joint Photographic Experts Group) file, is used as input image information, gamma correction has been performed so that the relation between the brightness of the object and the gradation value of the image information may not be linear. In such a case, gradation conversion is performed by the first gradation conversion unit 102 so that the relation between the brightness of the object and the gradation value of the image information is linear. An example of the gradation conversion is illustrated in FIG. 5. When the input gradation value is 0 to 254, conversion processing is performed through inverse correction of gamma correction so that the relation between the brightness and the gradation value is linear. When gamma correction of the input image information is unclear, for example, it is also possible to perform the conversion processing by assuming that the input image information is sRGB.

Figure 6:
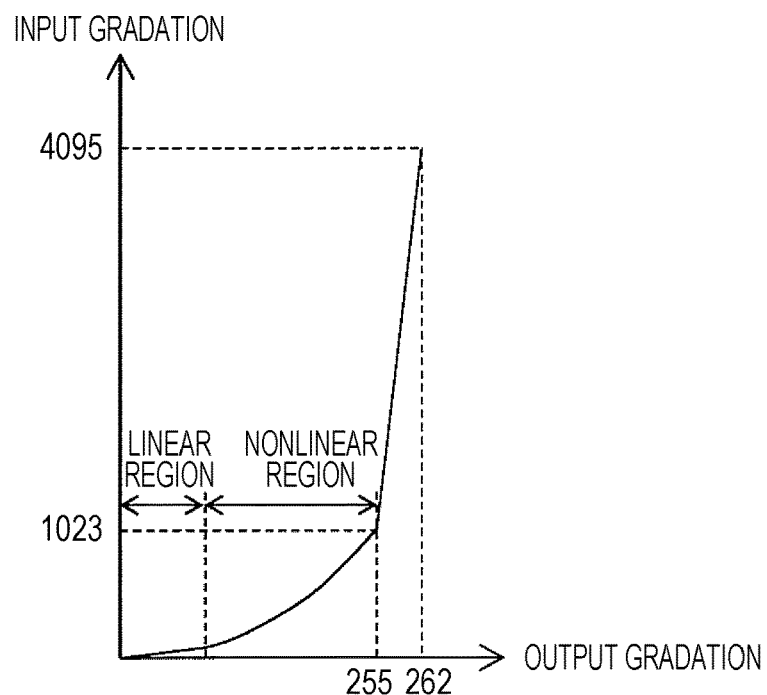
FIG. 6 illustrates an example of gradation conversion characteristics.

Further, when conversion corresponding to gamma correction is performed, resolution may be reduced due to influence of quantization in a low gradation part of the input image information. At this time, by performing gradation conversion with the linear relation for the low gradation part as illustrated in FIG. 6, it is possible to prevent deterioration of the gradation.

In the image information that has been subjected to the gradation conversion by the first gradation conversion unit 102, a saturated pixel is estimated in accordance with brightness of an object. FIG. 7(a) illustrates an example of input image information, and FIG. 7(b) illustrates an example of image information that has been subjected to the gradation conversion by the first gradation conversion unit 102, in which a gradation value of the input image information and brightness of an object have a linear relation. In FIG. 7(a), brightness of an image is partially saturated. On the other hand, in FIG. 7(b), a gradation value is provided by estimating the brightness of the object in a region which is saturated in FIG. 7(a). This is because the saturation is calculated by the saturation determination unit 101, for example, on the basis of an amount of saturated pixels in a specific range.

Figure 7:
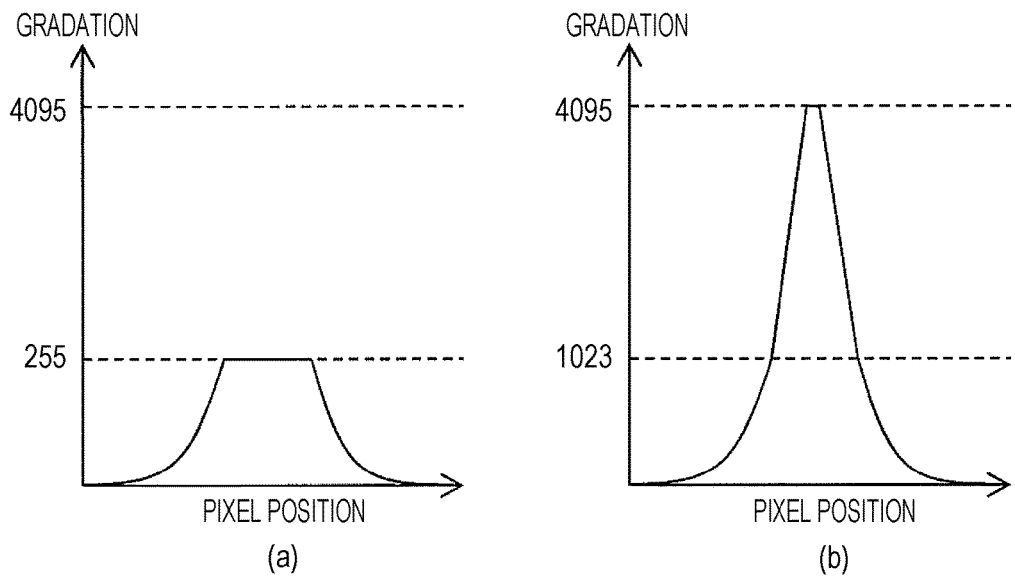
FIG. 7 illustrates a relation between a pixel position and gradation.
Figure 8:
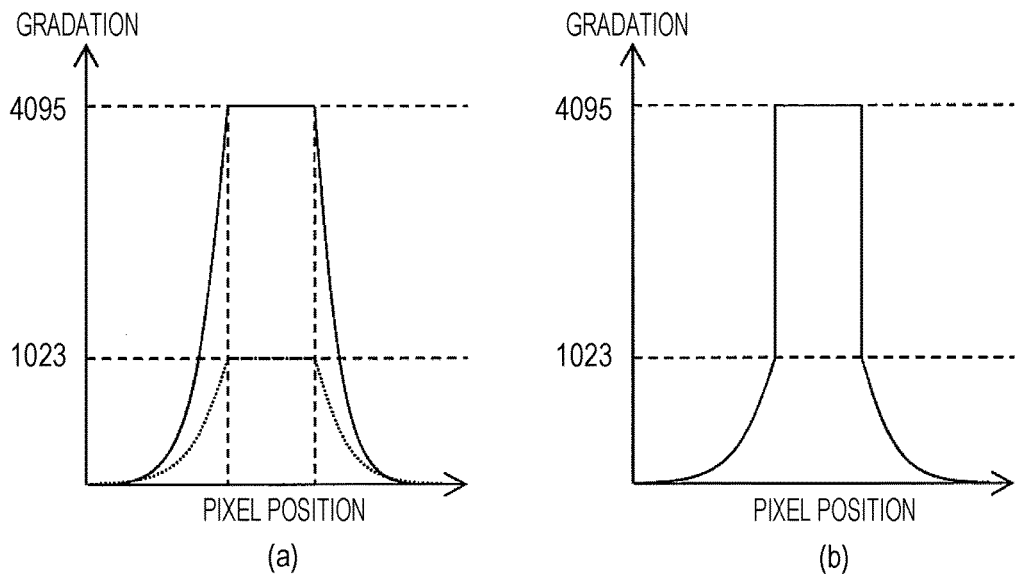
FIG. 8 illustrates a relation between a pixel position and gradation.

FIG. 8 illustrates a state where the state of FIG. 7(a) is subjected to gradation conversion with a conventional method, in which FIG. 8(a) illustrates a case where conversion of extending the gradation value in accordance with the gradation value of the input image information is performed and FIG. 8(b) illustrates a case where conversion of extending only a saturated pixel is performed. In FIG. 8(a), gradation conversion is performed on the basis of only the gradation value of the input image information, so that the relation between the brightness and the gradation value from 0 to 254 is distorted and the saturated pixel remains saturated. On the other hand, in FIG. 8(b), gradation conversion of extending only the gradation of the saturated pixel is performed, so that only the saturated pixel becomes too bright and the saturated pixel also remains saturated. By performing the gradation conversion in accordance with the saturation as in the present embodiment, it is possible, for the brightness of the object, to estimate the gradation value of the saturated pixel so that gradation becomes smooth and natural as in FIG. 7(b).

Figure 9:
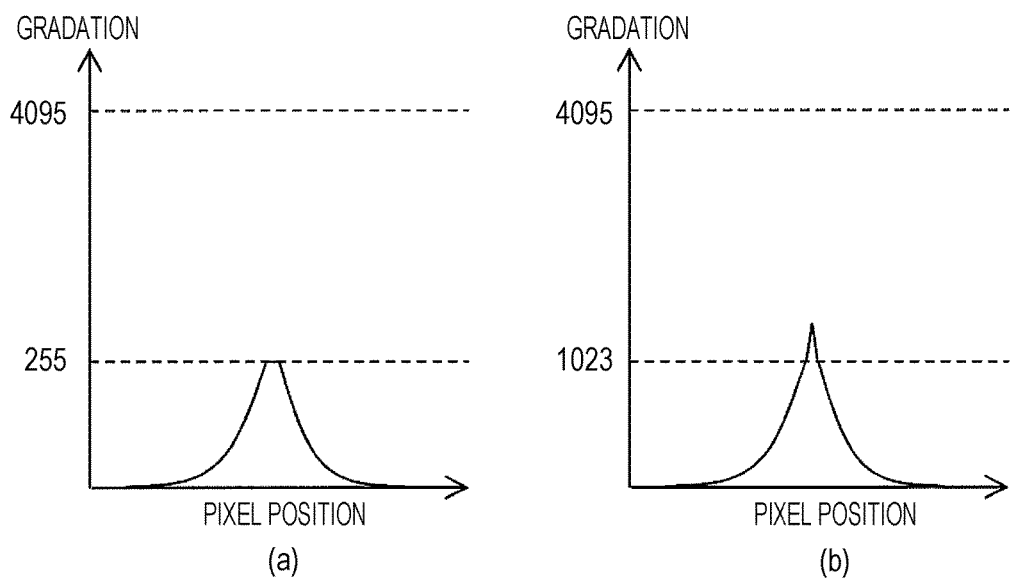
FIG. 9 illustrates a relation between a pixel position and gradation.

FIG. 9 illustrates an example of a gradation value of image information different from that of FIG. 7. In FIG. 9(a), a range of the saturated pixel is narrower compared to that of FIG. 7(a). FIG. 9(b) illustrates image information that has been subjected to gradation conversion by the first gradation conversion unit 102. Since the range of the saturated pixel of FIG. 9(a) is narrow, the saturation calculated by the saturation determination unit 101 is not maximum and the gradation value after the gradation conversion is not maximum, so that the brightness of the object is able to be estimated as a natural brightness change.

Figure 10:
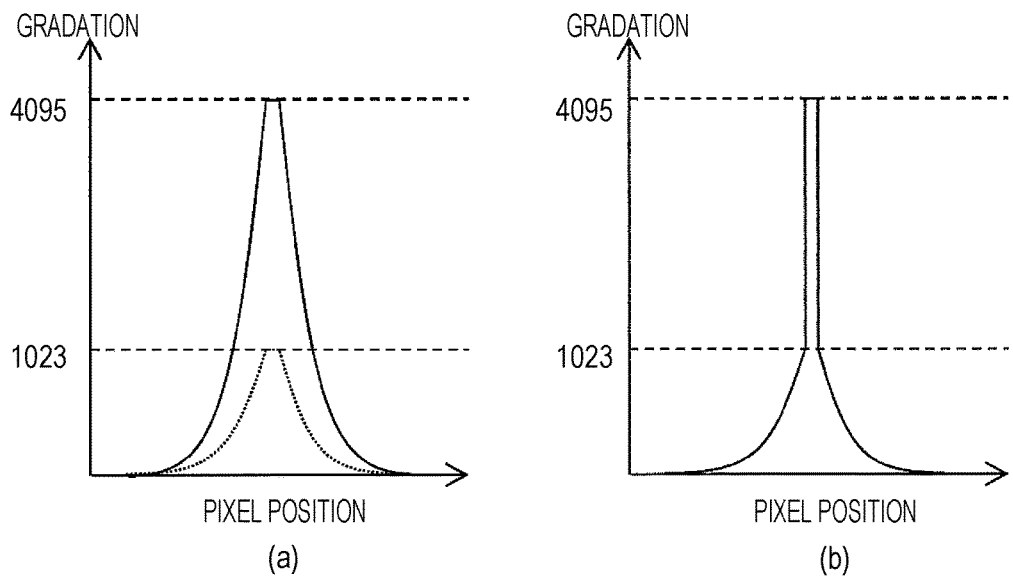
FIG. 10 illustrates a relation between a pixel position and gradation.

FIG. 10 illustrates a state where the state of FIG. 9(a) is subjected to gradation conversion with a conventional method, in which FIG. 10(a) illustrates a case where conversion of extending the gradation value in accordance with the gradation value of the input image information is performed and FIG. 10(b) illustrates a case where conversion of extending only a saturated pixel is performed. In FIG. 10(a), gradation is converted on the basis of only the gradation value of the input image information, so that the relation between the brightness and the gradation value from 0 to 254 is distorted and the saturated pixel remains saturated. On the other hand, in FIG. 10(b), gradation conversion of extending only the gradation of the saturated pixel is performed, so that only the saturated pixel becomes too bright and the saturated pixel also remains saturated.

Thus, by performing the gradation conversion in accordance with the saturation as in the present embodiment, it is possible, for the brightness of the object, to estimate the gradation value of the saturated pixel so that gradation becomes smooth and natural as in FIG. 9(b).

The image information that has been subjected to the gradation conversion by the first gradation conversion unit 102 is subjected to blurring processing by the blurring processing unit 103. The blurring processing is able to be realized by averaging a target pixel and surrounding pixels. As averaging processing, a method of setting weights of the respective pixels to be the same, a method of performing weighting in accordance with a distance from the target pixel, or the like is able to be selected as appropriate.

Intensity of the blurring processing, which indicates to what extent the blurring processing is to be performed, is able to be adjusted by changing a range to be averaged. When the range to be averaged is wide, the blurring intensity is great, and when the range to be averaged is narrow, the blurring intensity is small.

A shape of blur is able to be changed to, for example, a quadrangle, a hexagon, an octagon, or the like by adjusting a shape of the range to be averaged on the basis of the shape of the range to be averaged. Thus, when it is set so that the shape of blur is able to be set by a user, the user is able to obtain a desired shape of blur.

Figure 11:
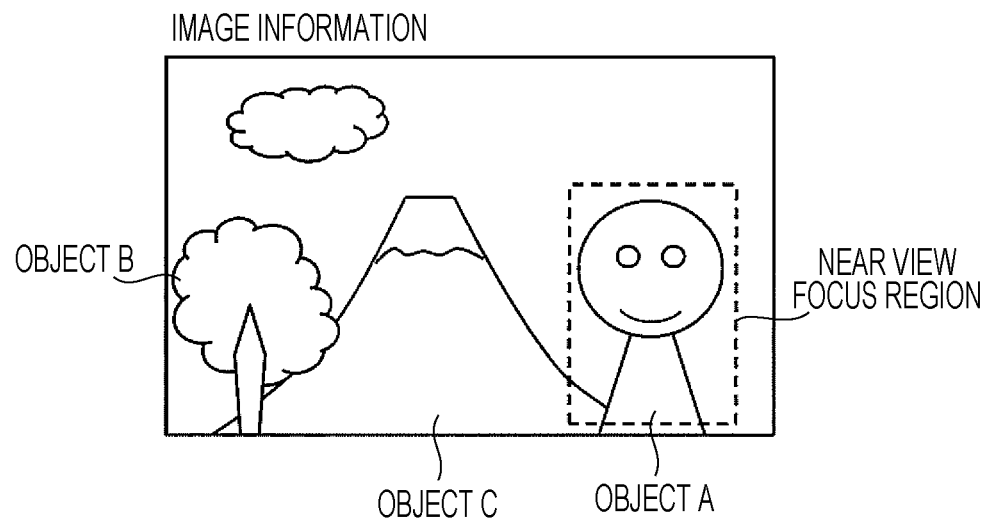
FIG. 11 illustrates an example of image information.

FIG. 11 illustrates an example of image information, in which an object A, an object B, and an object C are arranged in this order in order of proximity to a photographing place.

Figure 12:
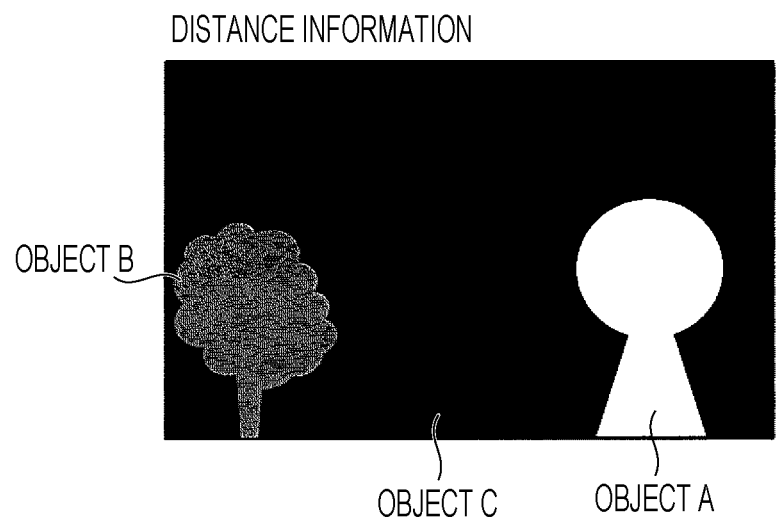
FIG. 12 illustrates an example of distance information corresponding to image information.

FIG. 12 illustrates distance information corresponding to the image information illustrated in FIG. 11. In FIG. 12, distance information indicated by a contrast is able to be acquired by a conventional technique, and is able to be calculated, for example, from TOF (Time Of Flight), a stereo camera, or the like. The distance information is able to be calculated also from images captured at different focus positions, and the distance information is able to be calculated by comparing in-focus degrees of the images in the target pixel. Such distance information is input to the image processing device 100 correspondingly to input image information together with the image information.

The blurring processing unit 103 performs the blurring processing on the basis of the distance information. For example, when the object A as a near view focus region is focused on and a background is blurred, the blurring processing is performed by changing blurring intensity on the basis of a difference between a distance to the object A and a distance to each object. That is, the blurring processing is not performed for the object A, the blurring processing is performed for the object B, and the blurring processing is performed for the object C with greater blurring intensity than that of the object B. In this case, as a processing method when there are a plurality of blurring processing intensities, averaging processing may be performed by changing an averaging range to be wider as the distance is farther on the basis of the distance information, or images whose averaging ranges are different may be created to select a pixel from the images whose averaging ranges are different on the basis of the distance information.

It is also possible to perform the blurring processing by focusing on another object different from the object A, and when the object B is focused on and the different object is blurred, for example, the blurring processing is performed by changing the blurring intensity of the blurring processing on the basis of a difference between a distance to the object B and a distance to the different object. Thus, when it is set so that the user is able to designate an object to be focused on, it is possible to obtain an image subjected to the blurring processing desired by the user.

Note that, though the example in which blurring processing is performed on the basis of distance information has been described in the present embodiment, other blurring processing may be used. For example, blurring processing for blurring a region designated by the user or a region not designated by the user may be performed.

The image information for which the blurring processing has been performed by the blurring processing unit 103 is transmitted to the second gradation conversion unit 104 and subjected to gradation conversion. For example, gradation conversion processing is able to be performed on the basis of characteristics as in FIG. 13. Illustrated is a case where a gradation value of image information, which has been subjected to the first gradation conversion by using characteristics of FIG. 4 and then subjected to the blurring processing, is 0 to 4095 and output image information from the image processing device 100 is output with gradation of 0 to 255.

Figure 13:
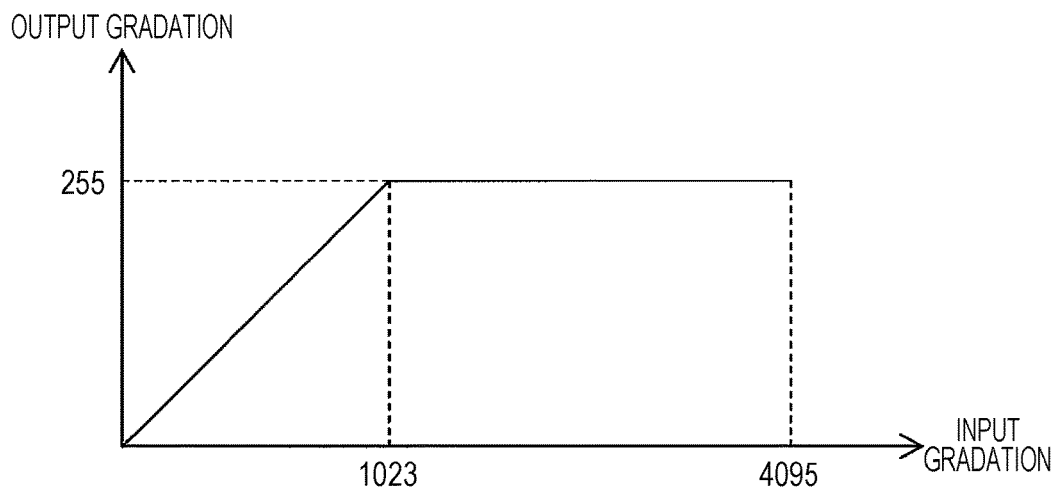
FIG. 13 illustrates an example of gradation conversion characteristics.

The gradation whose input gradation value is 1023 or more in FIG. 13 is a saturated pixel in the input image information of the image processing device 100, so that the gradation from 1023 to 4095 is output as 255. The gradation less than 1023 is converted to gradation between 0 and 255 so that a linear relation is kept.

Figure 14:
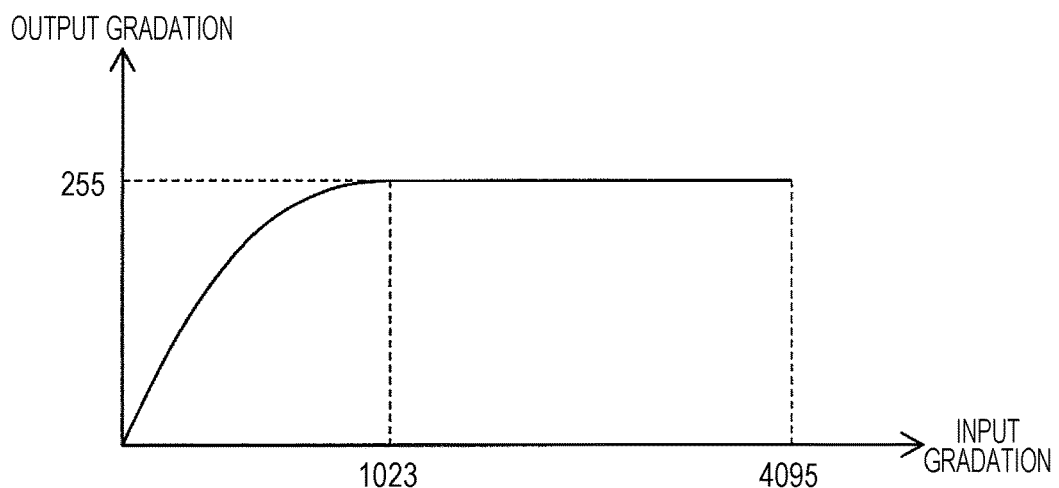
FIG. 14 illustrates an example of gradation conversion characteristics.

Note that, when the output image information is output by considering gamma correction, conversion considering gamma correction may be performed when a value less than 1023 is converted as in characteristics illustrated in FIG. 14. Further, when gradation conversion is performed by the first gradation conversion unit 102 with characteristics as in FIG. 6, a low gradation region which is converted with a linear relation is converted so that the linear relation is kept, and conversion considering gamma correction is performed for the other regions, thus making it possible to generate an output image corresponding to brightness of the input image information. With such conversion, it is possible to maintain a brightness relation between the input image information and the output image information and output image information subjected to natural blurring processing.

The image information that has been subjected to the gradation conversion by the second gradation conversion unit 104 is output with gradation, which has been a saturated pixel when being input to the image processing device 100, as the saturated pixel.

Figure 15:
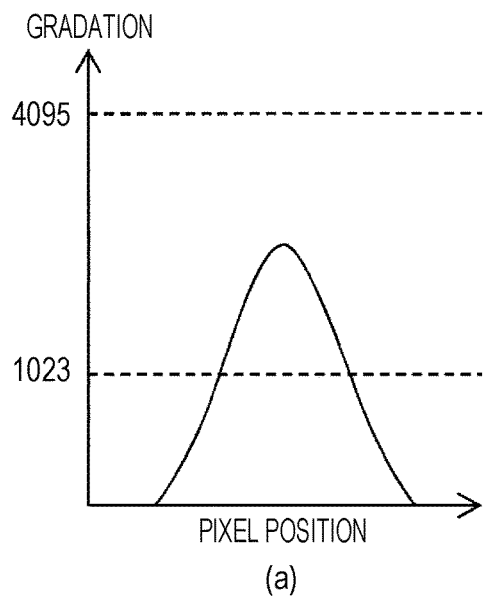
FIG. 15 illustrates a relation between a pixel position and gradation.
Figure 15:
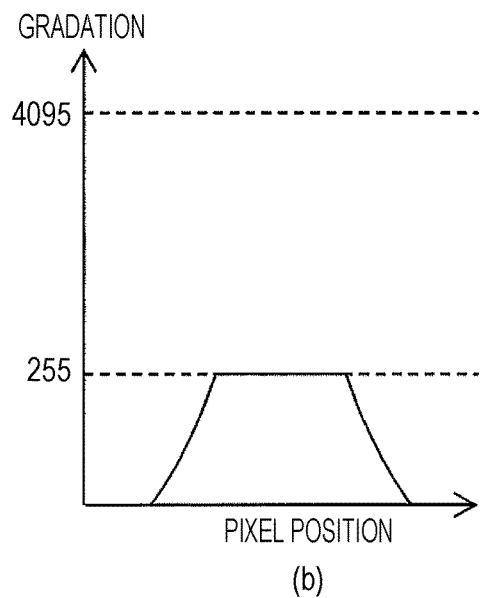

FIG. 15(*a*) illustrates an example of image information input to the second gradation conversion unit 104 and FIG. 15(*b*) illustrates an example of image information output from the second gradation conversion unit 104, in which a gradation value of the image information and brightness of an object have a linear relation. In FIG. 15(*a*), there are pixels that correspond to the gradation value of the saturated pixel and have the gradation value of 1023 or more. On the other hand, in FIG. 15(*b*), conversion is performed to the gradation value of 255 or less and pixels that have gradation greater than 1023 are converted being saturated to the gradation value of 255. As a result, conversion by which the gradation value that has been extended by estimating brightness of the object with use of the saturation is returned to the gradation before the extension is performed, so that output image information corresponding to the brightness of the input image information is able to be output.

Figure 16:
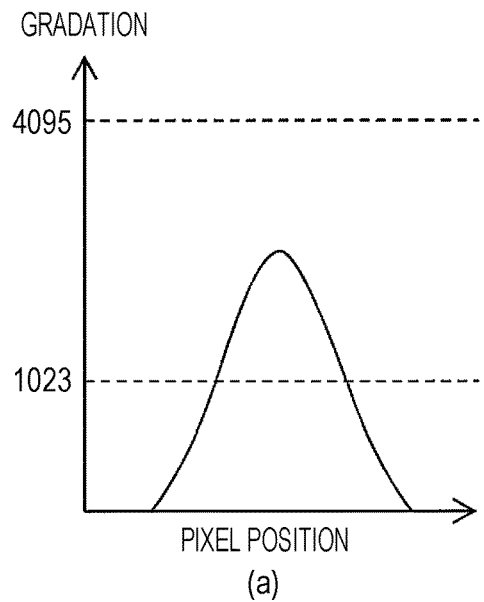
FIG. 16 illustrates a relation between a pixel position and gradation.
Figure 16:
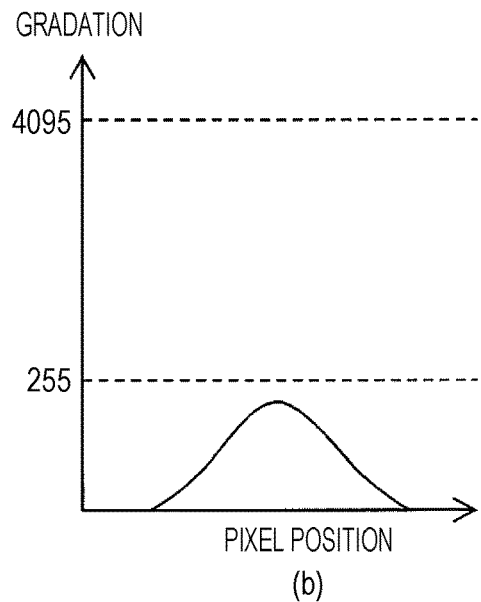

FIG. 16 illustrates an example when gradation conversion is performed on the basis of only the gradation value with use of a conventional method. For example, FIG. 16(*a*) indicates a result of performing blurring processing after gradation conversion is performed with a conventional method as in FIG. 8 or FIG. 10 and FIG. 16(*b*) indicates a result when inverse conversion to that of FIG. 8 or FIG. 10 is performed on the basis of only the gradation value. As illustrated in FIG. 16(*b*), a region that has been the saturated pixel before gradation conversion of extending gradation is not the saturated pixel when being set as output image information, so that an image becomes dark. That is, output image information corresponding to the brightness of the input image information is not able to be output with the conventional method. In this manner, by performing the conversion as in FIG. 15, output image information corresponding to the brightness of the input image information is able to be output.

As described above, according to the present embodiment, by calculating saturation of a saturated pixel of input image information, performing gradation conversion, and then performing blurring processing, it is possible to obtain a natural blurred image considering brightness of an object. Further, by performing gradation conversion for the blurred image by considering saturated gradation of an input image, it is possible to obtain output image information corresponding to brightness of the input image information.

Though description has been given for processing of one piece of image information in the aforementioned embodiment, the embodiment is able to be applied as image processing of a moving image when input is performed as continuous pieces of image information and each of the pieces of image information is caused to correspond to a frame.

Embodiment 2

A configuration of the image processing device 100 in the present embodiment is similar to that of Embodiment 1, so that detailed description for common units will be omitted.

The image processing device 100 in the present embodiment is different from the image processing device 100 of Embodiment 1 in a method of gradation conversion by the first gradation conversion unit 102. Input image information in Embodiment 2 is targeted for a color image and different gradation conversion processing is performed in the first gradation conversion unit 102 between saturation for white and saturation for a specific color.

Figure 19:
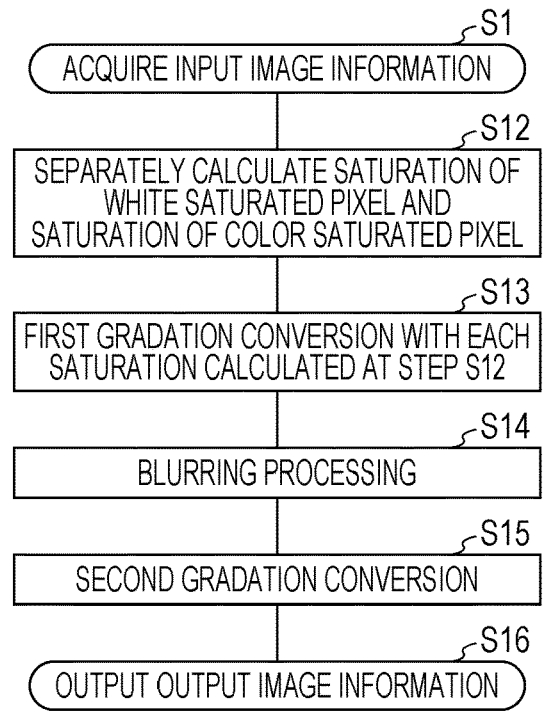
FIG. 19 illustrates an example of a flowchart of an image processing method according to a second embodiment of the invention.

FIG. 19 is a flowchart illustrating a flow of processing in Embodiment 2 and corresponds to FIG. 18. Processing at step S1 is similar to that of FIG. 18.

For example, in a color image formed by three channels of red, green, and blue, saturation for white provides a state where the gradation of red, green, and blue is saturated, and saturation for a specific color provides a state where the gradation of at least one channel of red, green, and blue is saturated and at least one channel is not saturated.

Though estimation of a gradation value of a saturated pixel is able to be performed in both of the saturation for white and the saturation for the color, an object of the saturation for white is brighter than that of the saturation for the color, so that the estimation needs to be performed as different brightness. That is, gradation conversion is performed by separately calculating the saturation for white and the saturation for the color.

The saturation determination unit 101, though being able to be realized by an operation similar to that of Embodiment 1, calculates saturation of a white saturated pixel and saturation of a color saturated pixel separately (step S12). For example, when a minimum gradation value of a channel of a target pixel is calculated and the minimum gradation value is 255 and the target pixel is saturated, processing is performed as the white saturated pixel. When being not the white saturated pixel, and when a maximum gradation value of the channel of the target pixel is calculated, the maximum gradation value is 255, and the target pixel is saturated, processing is performed as the color saturated pixel. By defining the saturated pixel in this manner, it is possible to calculate the saturation of the white saturation and the color saturation.

On the basis of the saturation calculated by the saturation determination unit 101, gradation conversion is performed by the first gradation conversion unit 102 (step S13).

Figure 17:
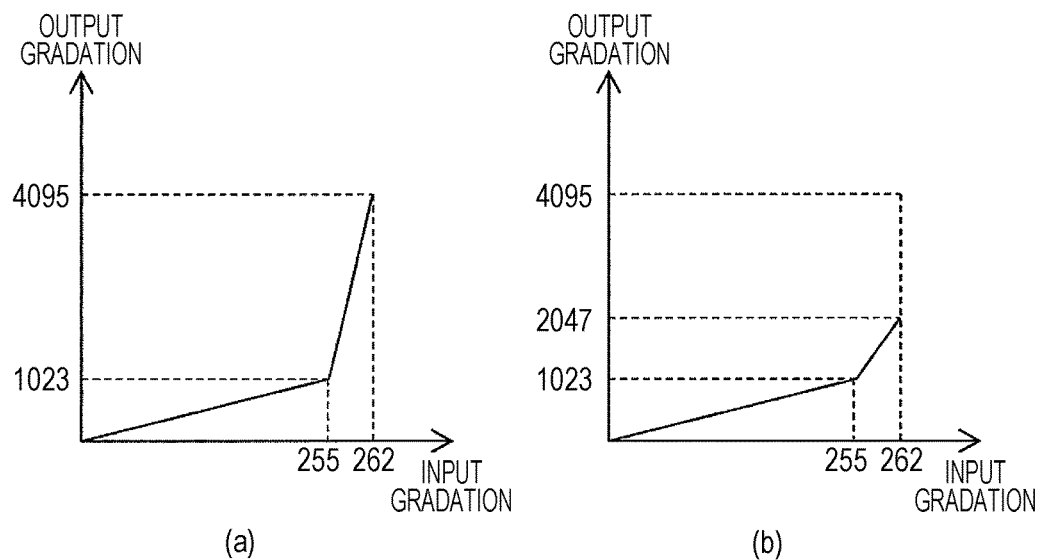
FIG. 17 illustrates an example of gradation conversion characteristics.

FIG. 17 illustrates an example of gradation conversion characteristics of the first gradation conversion unit 102. FIG. 17(*a*) illustrates gradation conversion characteristics of a white saturated pixel and FIG. 17(*b*) illustrates gradation conversion characteristics of a color saturated pixel. Since it is estimated that the white saturated pixel is obtained from an object brighter than that of the color saturated pixel, a maximum value of gradation conversion is varied between the case of the white saturated pixel and the case of the color saturated pixel in order to correspond to brightness of the object in FIG. 17. In the gradation conversion characteristics of the white saturated pixel of FIG. 17(*a*), a maximum value of an output gradation value is 4095. On the other hand, in the gradation conversion characteristics of the color saturated pixel of FIG. 17(*b*), a maximum value of an output gradation value is 2047 so as to make darker than the white saturated pixel even when the saturation is the same. Similarly to Embodiment 1, image information output from the first gradation conversion unit 102 is processed by the blurring processing unit 103 (step S14) and the second gradation conversion unit 104 (step S15) and set as output image information (step S16). Processing in each of the units is able to be realized by performing processing independently for each channel. That is, in the case of red, averaging is performed in a channel of red, and a gradation region that is saturated in input image information is subjected to gradation conversion as a saturated pixel in the channel of red and the resultant is output. The similar is also applied to other channels.

By performing processing described above, natural blurring processing is able to be realized for a saturated pixel in accordance with brightness of an object, and by performing different gradation conversion between the white saturated pixel and the color saturated pixel, it is possible to obtain an output image that is brighter in the white saturation compared to the color saturation and corresponds to brightness of the object.

Here, though description has been given with two types of gradation conversion characteristics of FIG. 17(*a*) and FIG. 17(*b*) in the present embodiment, for example, saturated pixels may have three types of white saturation, two-channel color saturation, and one-channel color saturation and gradation conversion characteristics may have three types. That is, gradation conversion is performed so that brightness of an object is estimated to be great in the order of the white saturation, the two-channel color saturation, and the one-channel color saturation.

In the two types of gradation conversion characteristics, input gradation is common from 0 to 254, so that a conversion value of a color saturated region may be calculated by using gradation characteristics of white saturation. For example, in FIG. 17(*a*), a difference between 1023 that is a minimum value of the saturated pixel and the conversion value provided in accordance with saturation is calculated, a half of the difference is added to 1023 that is the minimum value of the saturated pixel, and the resultant is set as a gradation conversion value of the color saturated pixel. At this time, a maximum value of the gradation conversion value of the color saturated pixel is 2559. That is, it is set so that the conversion value is calculated with the gradation characteristics of the white saturation, and on the basis of a value thereof, a value smaller than the white saturation is converted as the conversion value.

According to the present embodiment, by calculating saturation of a saturated pixel of input image information for each of channels in a color image, performing gradation conversion for each of the channels, and then performing blurring processing, it is possible to obtain a more natural blurred image considering brightness and a color of an object in the color image. Further, by performing gradation conversion for the blurred image by considering saturation gradation of an input image, it is possible to obtain output image information corresponding to brightness of the input image information.

Embodiment 3

A configuration of the image processing device 100 in the present embodiment is similar to that of Embodiment 1, so that detailed description for common units will be omitted.

Figure 20:
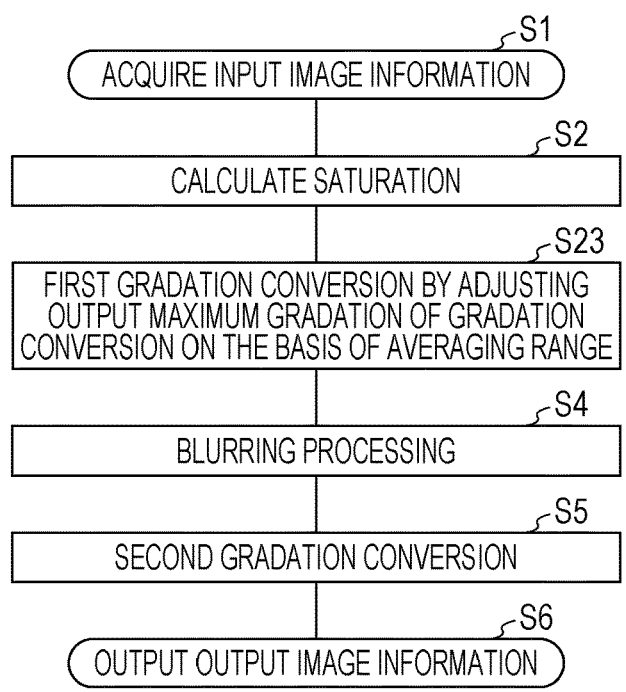
FIG. 20 illustrates an example of a flowchart of an image processing method according to a third embodiment of the invention.

FIG. 20 is a flowchart illustrating a flow of processing in Embodiment 3 and corresponds to FIG. 18. The processing at step S3 is set as processing of step S23.

Compared to the image processing device 100 of Embodiment 1, the image processing device 100 in the present embodiment varies gradation conversion of the first gradation conversion unit in accordance with an averaging range in the blurring processing unit 103 (step S23).

Description has been given in Embodiment 1 for that the blurring intensity varies when a range to be averaged becomes different. At this time, brightness of an image after blurring processing varies in accordance with magnitude of an estimated value of brightness of a saturated pixel. This is because when the range to be averaged becomes different, a degree of influence of the saturated pixel varies. For example, when there is one saturated pixel and the gradation value is converted from 255 to 4095, the degree of influence varies in accordance with whether the range to be averaged is a range of 9 pixels of 3×3 or a range of 81 pixels of 9×9. Between a case of gradation in which 1 pixel of the 9 pixels is extended and a case of gradation in which 1 pixel of the 81 pixels is extended, an averaged value is greater in the former case.

Thus, when an estimated value of the saturated pixel is excessively great, blurring may be performed with excessive brightness, so that when the range to be averaged is narrow, a maximum value of the gradation value converted by the first gradation conversion unit 102 decreases, and when the range to be averaged is wide, the maximum value of the gradation value converted by the first gradation conversion unit 102 increases, thus making it possible to perform appropriate blurring processing.

In this manner, in the present embodiment, when blurring processing is performed on the basis of distance information corresponding to image information, a range to be averaged varies in accordance with a distance between an in-focus object and an object to be blurred, so that appropriate blurring processing is able to be performed by changing a maximum value of gradation conversion in accordance with the distance.

Embodiment 4

A configuration of the image processing device 100 in the present embodiment is similar to that of Embodiment 1, so that detailed description for common units will be omitted.

Figure 21:
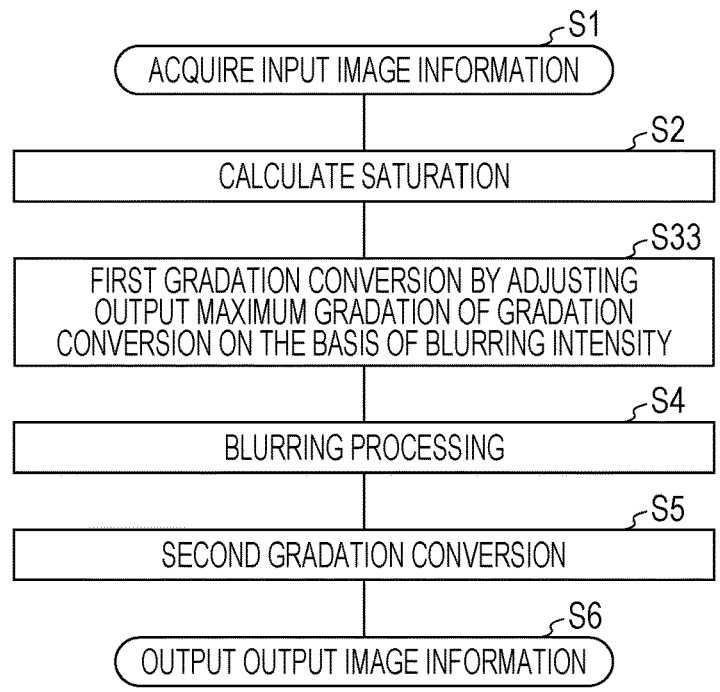
FIG. 21 illustrates an example of a flowchart of an image processing method according to a fourth embodiment of the invention.

FIG. 21 is a flowchart illustrating a flow of processing in Embodiment 4 and corresponds to FIG. 18. The processing at step S3 is set as processing of step S33.

The image processing device 100 in the present embodiment adjusts a maximum value of a gradation conversion value of the first gradation conversion unit 102 to be varied in accordance with the blurring intensity of the blurring processing unit 103 (step S33). The blurring intensity of the blurring processing unit 103 indicates intensity of blurring processing, and the blur becomes greater as the intensity increases, and the blur becomes smaller as the intensity decreases. There is a case where the blurring intensity is automatically set in accordance with a scene of input image information, a distance to an in-focus object, a distance between a near view object and a distant view object, or the like and a case where it is manually set by a user before photographing or after photographing.

For varying the blurring intensity, the ranges to be averaged, which are set in the respective distances, are adjusted. For example, when increasing the blurring intensity, each of the ranges to be averaged, which is set on the basis of a distance from an in-focus object to a target object, is set to be wider by one step. On the other hand, when decreasing the blurring intensity, each of the ranges to be averaged, which is set on the basis of a distance from an in-focus object to a target object, is set to be narrower by one step.

Here, as described in Embodiment 3, when the maximum value of the gradation conversion value is varied in accordance with the range to be averaged, blurring processing is able to be performed with natural brightness. Thus, when it is set to increase the intensity of the blurring processing, the averaging range is set to be wider, so that the maximum value of the conversion gradation value is increased, whereas when it is set to decrease the intensity of the blurring processing, the averaging range is set to be narrower, so that the maximum value of the conversion gradation value is decreased. For example, when the blurring intensity is great, the maximum value of the conversion gradation value is set to 4095 as in FIG. 17(*a*), and when the blurring intensity is small, the maximum value of the conversion gradation value is set to 2047 as in FIG. 17(*b*). By varying the maximum value of the gradation conversion value in accordance with the blurring intensity, which is set, in this manner, natural blurring processing is able to be performed with appropriate brightness.

Embodiment 5

A configuration of the image processing device 100 in the present embodiment is similar to that of Embodiment 1, so that detailed description for common units will be omitted.

Figure 22:
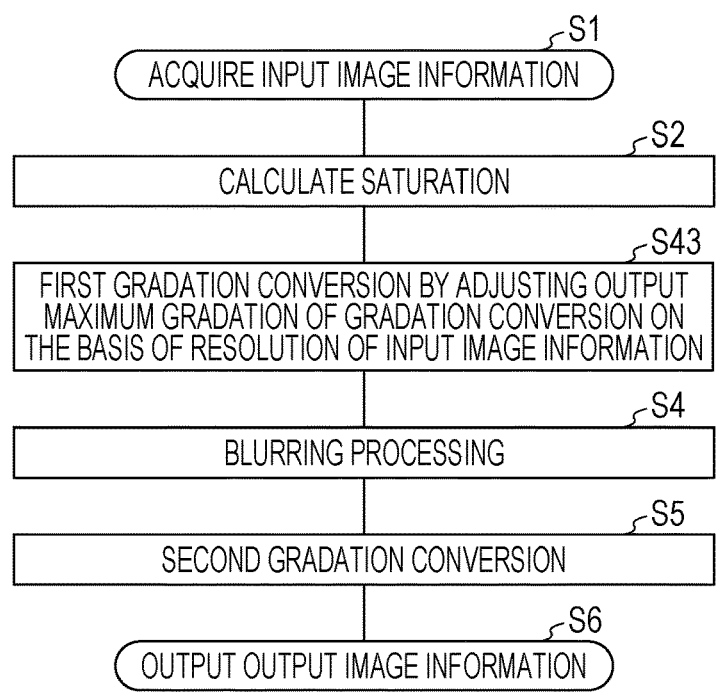
FIG. 22 illustrates an example of a flowchart of an image processing method according to a fifth embodiment of the invention.

FIG. 22 is a flowchart illustrating a flow of processing in Embodiment 5 and corresponds to FIG. 18. The processing at step S3 is set as processing of step S43.

The image processing device 100 in the present embodiment adjusts a maximum value of a gradation conversion value of the first gradation conversion unit 102 to be varied in accordance with resolution of input image information (step S43). A range to be averaged for blurring processing by the blurring processing unit 103 is set in a range based on an object. That is, the number of pixels of any range to be averaged when the same scene is photographed with the same angle of view is greater in image information having high resolution compared to an image having low resolution. This is because pixel resolution in the same range of an object is different. Thus, in a case where input image information having high resolution is subjected to blurring processing, a sum of the numbers of pixels of a target pixel and surrounding pixels to be averaged is greater compared to a case where input image information having low resolution is subjected to blurring processing.

Here, as described in Embodiment 3, when a maximum value of a gradation conversion value is varied on the basis of a range to be averaged, blurring processing is able to be performed with natural brightness. Thus, when resolution of input image information is high, the maximum value of the gradation conversion output value subjected to gradation conversion by the first gradation conversion unit 102 is increased, and when resolution of input image information is low, the maximum value of the gradation conversion output value subjected to gradation conversion by the first gradation conversion unit 102 is decreased, so that blurring processing is able to be performed with natural brightness. For example, such blurring processing is able to be realized by using the gradation conversion characteristics as in FIG. 17(*a*) when resolution of the input image information is high and by using the gradation conversion characteristics as in FIG. 17(*b*) when resolution of the input image information is low.

Embodiment 6

In the present embodiment, as to an image processing method that realizes functions indicated in the aforementioned embodiments as in FIGS. 18 to 22, for example, the image processing method that realizes the functions is recorded in a storage medium as a program. The image processing method is able to be realized when the program recorded in the storage medium is read and executed by a computer. As the storage medium, an optical disc, a magnetic disc, a flash memory, or the like may be used. The program may be provided by using a network line such as the Internet. Further, the image processing method is also able to be recorded as circuit information usable in FPGA. The circuit information is provided through a recording medium or the network and downloaded on the FPGA to realize image processing.

With the flows of FIGS. 18 to 22 above, the image processing method of the present embodiment is able to be realized and image information that corresponds to brightness of an object and is subjected to natural blurring processing is able to be obtained.

Embodiment 7

An image capturing device 200 of the present embodiment includes the image processing device 100, and detailed description for units common with those of Embodiment 1 will be omitted.

Figure 23:
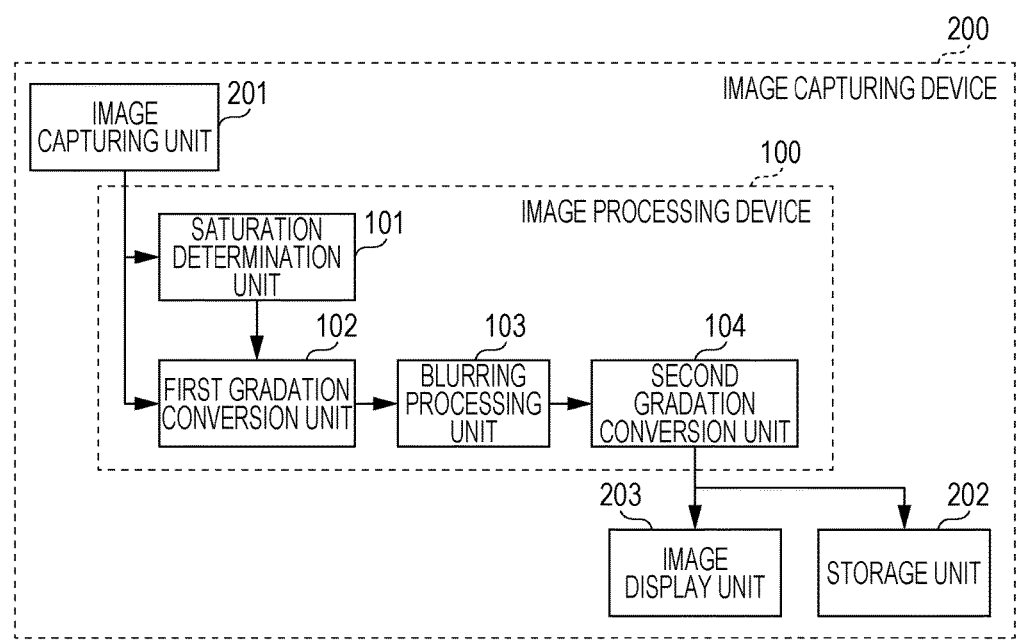
FIG. 23 illustrates a configuration example of an image capturing device according to a seventh embodiment of the invention.

FIG. 23 illustrates an example of a configuration of the image capturing device 200 in the present embodiment. The image capturing device 200 includes an image capturing unit 201, a storage unit 202, and an image display unit 203 in addition to the image processing device 100. The image capturing unit 201 captures an image of an object to acquire image information, and inputs the image information to the image processing device 100. At this time, distance information corresponding to the image information is also input. The distance information may be acquired by the image capturing unit 201 with a distance sensor such as TOF, the distance information may be calculated by capturing a stereo image and calculating disparity information, or the distance information may be calculated by calculating an in-focus degree of a plurality of images captured at different focus positions.

In the image processing device 100, saturation of a saturated pixel is determined and gradation conversion is performed, and then, blurring processing is performed. The image information output from the image processing device 100 is saved in the storage unit 202 in any format. The image information subjected to image processing is able to be displayed on the image display unit.

As described above, with the image capturing device 200 including the image processing device 100, it is possible to realize an image capturing device that is able to estimate brightness of an object in accordance with saturation of a saturated pixel even when the object is photographed with saturation and acquire image information that corresponds to brightness of the object and is subjected to natural blurring processing.

Processing and control are able to be realized by software processing with a CPU or a GPU, or hardware processing with an ASIC or an FPGA.

Moreover, in the aforementioned embodiments, configurations and the like are not limited to those illustrated in the accompanying drawings, and may be changed appropriately within the scope of producing the effects of the invention. Additionally, the aforementioned embodiments may be implemented with some appropriate alternations as long as the implementation does not depart from the scope of the aim of the invention.

Further, any components of the invention may be selected, and the invention that includes the selected configuration is also included in the invention.

Further, a program for realizing the functions that are described in the present embodiment may be recorded in a computer-readable recording medium, the program that is recorded in the recording medium may be read and executed by a computer system, and processing of each unit may thereby be performed. It should be noted that the "computer system" herein includes an OS and hardware such as peripheral devices.

In addition, the "computer system" also includes a home page providing environment (or displaying environment) if a www system is used.

The "computer-readable recording medium" includes a portable medium such as a flexible disk, a magneto-optical disk, a ROM, or a CD-ROM, and a storage device such as a hard disk which is incorporated in a computer system. Further, the "computer-readable recording medium" also includes one for dynamically holding a program over a short period of time such as a network, e.g. the Internet or the like, or a communication line used in a case of transmitting a program via a communication line such as a telephone line, and one for holding a program over a certain period of time such as a volatile memory in a computer system which serves as a server or a client in such a case. The program may be a program for implementing a part of the aforementioned functions, or a program capable of implementing the aforementioned functions in combination with a program that has been already recorded in the computer system. At least a part of the functions may be implemented by hardware such as an integrated circuit.

REFERENCE SIGNS LIST

100 image processing device
101 saturation determination unit
102 first gradation conversion unit
103 blurring processing unit
104 second gradation conversion unit
200 image capturing device
201 image capturing unit
202 storage unit
203 image display unit All publications, patents, and patent applications cited herein are incorporated herein by reference in their entirety.

The invention claimed is:

1. An image processing device comprising:
   first gradation conversion circuitry that converts gradation of input image information that is input, on a basis of saturation of a saturated pixel of the input image information;
   blurring processing circuitry that performs blurring processing for the input image information that has been subjected to gradation conversion by the first gradation conversion circuitry; and
   second gradation conversion circuitry that converts the gradation of the input image information that has been subjected to the blurring processing, on a basis that gradation of a saturated region of the input image information that has been subjected to the blurring processing serves as gradation of a saturated pixel.

2. The image processing device according to claim 1, wherein the saturation is calculated on a basis of brightness of surrounding pixels of a target pixel.

3. The image processing device according to claim 1, wherein the saturation is calculated on a basis of the number of saturated pixels among surrounding pixels of a target pixel.

4. The image processing device according to claim 1, wherein the saturation is calculated on a basis of a sum of gradation values of surrounding pixels of a target pixel.

5. The image processing device according to claim 1, wherein the first gradation conversion circuitry performs conversion such that as the saturation is greater, a gradation value output by the conversion increases.

6. The image processing device according to claim 1, wherein as resolution of the input image information is greater, a maximum value of an output gradation value of the first gradation conversion circuitry varies to be great.

7. The image processing device according to claim 1, wherein the first gradation conversion circuitry differentiates gradation conversion between a white saturated pixel and a color saturated pixel of the input image information.

8. The image processing device according to claim 7, wherein gradation conversion is performed such that an output gradation value of the white saturated pixel is greater than an output gradation value of the color saturated pixel in a case where the saturation has the same degree.

9. The image processing device according to claim 1, wherein
the blurring processing circuitry varies intensity of blurring processing in accordance with blurring intensity that is set, and
the variation is performed such that as the blurring intensity is greater, a maximum value of an output gradation value of the first gradation conversion circuitry is great.

10. The image processing device according to claim 1, wherein
the blurring processing circuitry varies a range subjected to blurring processing on a basis of distance information corresponding to the input image information, and
the variation is performed such that as the range of the blurring processing is wider, a maximum value of an output gradation value of the first gradation conversion circuitry is great.

11. An image capturing device including image capturing circuitry that acquires image information, comprising the image processing device according to claim 1.

12. An image processing method comprising:
a first gradation conversion step of converting gradation of input image information that is input, on a basis of saturation of a saturated pixel of the input image information;
a blurring processing step of performing blurring processing for the input image information that has been subjected to gradation conversion at the first gradation conversion step; and
a second gradation conversion step of converting the gradation of the input image information that has been subjected to the blurring processing, on a basis that gradation of a saturated region of the input image information that has been subjected to the blurring processing serves as gradation of a saturated pixel.

13. A non-transitory computer readable medium including a computer program that causes a computer to execute the image processing method according to claim 12.

* * * * *